(12) United States Patent
Stibel

(10) Patent No.: US 8,904,500 B2
(45) Date of Patent: *Dec. 2, 2014

(54) ADVOCATE FOR FACILITATING VERIFICATION FOR THE ONLINE PRESENCE OF AN ENTITY

(71) Applicant: Credibility Corp., Malibu, CA (US)

(72) Inventor: Jeffrey M. Stibel, Malibu, CA (US)

(73) Assignee: Credibility Corp., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,973

(22) Filed: Feb. 25, 2014

(65) Prior Publication Data

US 2014/0173732 A1    Jun. 19, 2014

Related U.S. Application Data

(63) Continuation of application No. 13/968,045, filed on Aug. 15, 2013, now Pat. No. 8,713,651, which is a continuation of application No. 13/718,227, filed on Dec. 18, 2012, now Pat. No. 8,544,091.

(60) Provisional application No. 61/577,480, filed on Dec. 19, 2011.

(51) Int. Cl.
*H04L 29/06* (2006.01)
*G06Q 10/10* (2012.01)
*H04L 29/08* (2006.01)
*H04L 12/58* (2006.01)

(52) U.S. Cl.
CPC ............ *H04L 63/1408* (2013.01); *H04L 63/08* (2013.01); *G06Q 10/10* (2013.01); *H04L 63/126* (2013.01); *H04L 67/24* (2013.01); *H04L 12/5815* (2013.01); *H04L 67/02* (2013.01)

USPC .......... 726/5; 380/282; 705/1; 705/7; 705/35; 705/44; 455/411; 709/201; 726/7; 726/22; 726/25

(58) Field of Classification Search
CPC ............................ H04L 63/08; H04L 63/1408
USPC .......................................................... 726/5
See application file for complete search history.

(56) References Cited

U.S. PATENT DOCUMENTS 6,789,193 B1    9/2004    Heiden
7,984,500 B1    7/2011    Khanna et al.

(Continued)

OTHER PUBLICATIONS

Cognitive presence in online education| http://tccl.rit.albany.edu/knilt/images/6/68/Shea2009.pdf|Shea et al.|2009|pp. 543-553.*

(Continued)

*Primary Examiner* — Mahfuzur Rahman
(74) *Attorney, Agent, or Firm* — Los Angeles Patent Group; Arman Katiraei

(57) ABSTRACT

Some embodiments provide an advocate system to facilitate automated online presence verification for different entities on behalf of the entities. The advocate system places service providers on notice that profiles and information hosted by them and that form the online presence for a particular entity should first be verified with that particular entity. The advocate system further facilitates online presence verification by 1) directly or indirectly connecting the service providers that are placed on notice with the appropriate authoritative entities to facilitate the verification of the profiles and information, 2) selectively targeting service providers hosting profiles and information that are unverified, 3) automatedly verifying hosted profiles and information based on a verified profile lists and verified information that authoritative entities provide to a central repository. In so doing, the advocate system prevents potential damage to the authoritative entity's credibility while also mitigating potential for fraud, identity theft, etc.

18 Claims, 12 Drawing Sheets

(56) References Cited

U.S. PATENT DOCUMENTS

| | | | |
|---|---|---|---|
| 8,201,232 B2 | 6/2012 | Zhang et al. | |
| 8,286,225 B2 * | 10/2012 | Jakobsson | 726/5 |
| 8,406,428 B2 | 3/2013 | Bauchot et al. | |
| 8,429,751 B2 | 4/2013 | Mizrahi et al. | |
| 8,549,589 B2 | 10/2013 | Stollman | |
| 2003/0105966 A1 | 6/2003 | Pu et al. | |
| 2003/0126080 A1 | 7/2003 | Ogmen | |
| 2003/0212891 A1 | 11/2003 | Evans et al. | |
| 2004/0117615 A1 | 6/2004 | O'Donnell et al. | |
| 2005/0071683 A1 | 3/2005 | Mizuguchi | |
| 2006/0179304 A1 | 8/2006 | Han | |
| 2008/0304458 A1 | 12/2008 | Aghvami et al. | |
| 2009/0198686 A1 | 8/2009 | Cushman et al. | |
| 2010/0077048 A1 | 3/2010 | Czyzewicz et al. | |
| 2010/0122330 A1 | 5/2010 | McMillan et al. | |
| 2010/0130172 A1 | 5/2010 | Vendrow et al. | |
| 2010/0131409 A1 | 5/2010 | Lawyer et al. | |
| 2010/0198666 A1 | 8/2010 | Chiang et al. | |
| 2010/0255861 A1 | 10/2010 | Raviv et al. | |
| 2011/0040592 A1 | 2/2011 | Kurtzig et al. | |
| 2011/0040662 A1 | 2/2011 | Kurtzig | |
| 2011/0040694 A1 | 2/2011 | Kurtzig et al. | |
| 2011/0041173 A1 | 2/2011 | Kurtzig et al. | |
| 2011/0047245 A1 | 2/2011 | Abramson et al. | |
| 2011/0072039 A1 | 3/2011 | Tayloe | |
| 2011/0087705 A1 | 4/2011 | Swink et al. | |
| 2011/0125770 A1 | 5/2011 | Battestini et al. | |
| 2011/0161444 A1 | 6/2011 | Chauhan | |
| 2011/0179378 A1 | 7/2011 | Wheeler et al. | |
| 2011/0258024 A1 | 10/2011 | Prince | |
| 2011/0270751 A1 | 11/2011 | Csinger et al. | |
| 2011/0276484 A1 | 11/2011 | Pearson et al. | |
| 2011/0296514 A1 | 12/2011 | Koennecke | |
| 2012/0010924 A1 | 1/2012 | Piliouras | |
| 2012/0089410 A1 | 4/2012 | Mikurak | |
| 2012/0254904 A1 | 10/2012 | Brown et al. | |
| 2012/0266227 A1 | 10/2012 | Colson | |
| 2012/0291107 A1 | 11/2012 | Piliouras | |
| 2013/0179955 A1 | 7/2013 | Bekker et al. | |
| 2013/0191904 A1 | 7/2013 | Piliouras | |
| 2013/0263240 A1 | 10/2013 | Moskovitch | |

OTHER PUBLICATIONS eBay's ID Verify, The Advantages of eBay's ID Verify, May 2004, Retrieved from the Internet <URL:auctionbytes.com/cab/abu/y204/m05/abu119/s03>, pp. 1-2 as printed.

Google Association, Associate Email Addresses with your Google Account, Jan. 2008, Retrieved from the Internet <URL: blogoscoped.com/archive/2008-01-20-n36.html>, pp. 1-2 as printed.

* cited by examiner

Entity Name

Email Address

Search

Entity Name
Dun & Bradstreet Credibility
Street Address
City  State  Zip
Phone
Search

| Entity Name | Location |
|---|---|
| ● Dun & Bradstreet Credibility Corp. | 22761 Pacific Coast Hwy, Malibu, CA |
| ○ Dun & Bradstreet Credibility Corp | 3801 CORPORATE PKWY, CENTER VALLEY, PA |
| ○ Dun & Bradstreet Credibility Corp | 5210 E WILLIAMS CIR # 460, TUCSON, AZ |
| ○ Dun & Bradstreet Credibility Corp | 2000 PISGAH RD STE 200, GREENSBORO, NC |
| ○ Dun & Bradstreet Credibility Corp | 3800 AIRPORT BLVD, AUSTIN, TX |

Entity Not Listed   Confirm

ATTN:[Name,Title]
[Address]
[City, State, Zip Code]

Re: Notice Letter to [Directory Name] on behalf of [Company Name]

Dear [Directory Name]:

[Advocate] has been retained by [Company Name] to verify their business information and they have raised concerns that information is being published about their business without their permission. Moreover, some of the information on your website may not be accurate or valid, and has not been verified as such by our company or the owner of [Company Name].

The owner of [Company Name] has asked us to contact you directly and have any information that is not verified, either (i) removed or (ii) marked as unverified, until such date as your firm confirms the accuracy of the data with [Company Name] or our office.

Explanation of Potential Liability

Please be aware that [Advocate] makes no representations or warranties about your obligations, requirements or potential liability.

While this letter is not an official notification under Section 512(c) of the Digital Millennium Copyright Act ("DMCA"), [Company Name] has raised concerns about the veracity of your data and whether anyone has attempted to take ownership of content, contact information or copyright data that is proprietary to [Company Name]. In addition, [Company Name] has raised concern that someone other than the owner could fraudulently post on your website as the owner or an affiliate of [Company Name].

This letter is not intended to be an exhaustive recitation of [Company Name] legal rights and remedies and [Company Name] does not waive or limit any such rights or remedies, all of which are expressly reserved.

Information to Assist You

[Advocate] would like to encourage communication between you and the owner of [Company Name]. This will ensure that you always have the most accurate and up-to-date information, and that your services are fully utilized by [Company Name]. We can also work with you to help verify the ownership of the business data and ensure that only a verified business can claim ownership of said data.

We would be happy to assist you in receiving verified company information from [Company Name] as well as any other company whose information we have verified. So long as [Company Name] does not object, we can put you directly in touch with the business owner; otherwise, we can work as an intermediary to ensure that your data remains valid and verified. If you wish to follow up, please feel free to reach out to me directly at the contact information below.

Please give these matters your immediate attention and consideration. If you have any questions regarding this letter, please contact us directly. Thank you for your prompt attention to this matter.

Figure 5B

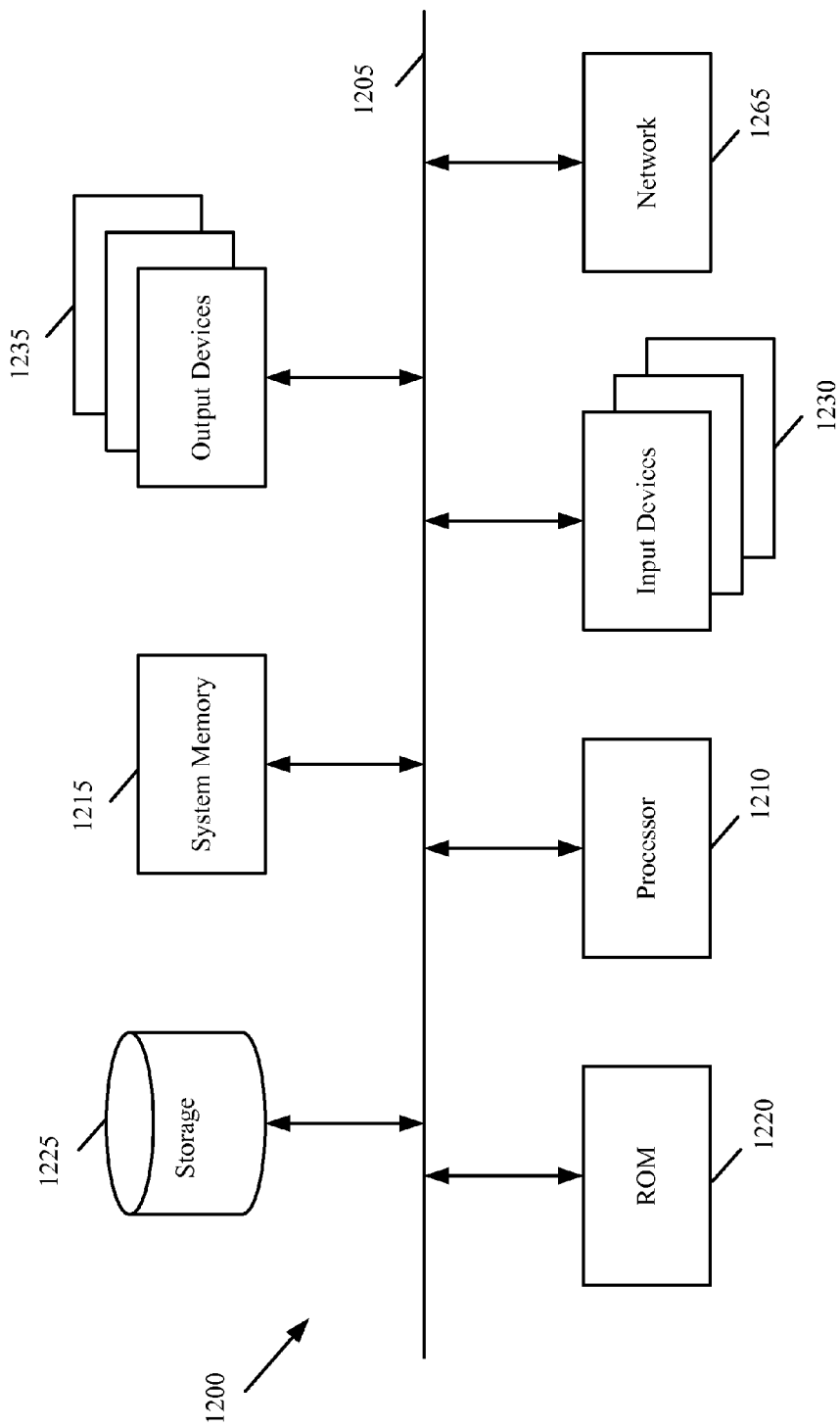

ADVOCATE FOR FACILITATING VERIFICATION FOR THE ONLINE PRESENCE OF AN ENTITY

CLAIM OF BENEFIT TO RELATED APPLICATIONS

This application is a continuation of U.S. nonprovisional application Ser. No. 13/968,045 entitled "Advocate for Facilitating Verification for the Online Presence of an Entity", filed Aug. 15, 2013 which is a continuation of U.S. nonprovisional application Ser. No. 13/718,227 entitled "Advocate for Facilitating Verification for the Online Presence of an Entity", filed Dec. 18, 2012, now U.S. Pat. No. 8,544,091, which claims the benefit of U.S. provisional application 61/577,480 entitled "Advocate for Facilitating Verification for the Online Presence of an Entity", filed Dec. 19, 2011. The contents of application Ser. Nos. 13/968,045, 13/718,227, and 61/577,480 are hereby incorporated by reference.

TECHNICAL FIELD

The present invention pertains to systems, methods, and software products for verifying an entity's online presence.

BACKGROUND

An online presence is essential to contemporary forms of interaction between entities including individuals and businesses. An online presence opens different mediums with which one can communicate with other entities. This includes communicating via email, social media messaging (e.g., Twitter® Tweets®, Facebook® posts, etc.), instant messaging, and the like. Also, an online presence yields an informational and/or promotional platform from which one can learn about a specific entity without having to directly engage with that specific entity.

An online presence can be established by creation of a profile at one or more different service providers. Some such service providers at which an online presence (i.e., profile) can be established include (1) email service providers (e.g., Gmail® and Yahoo® Mail), (2) social media service providers (e.g., Facebook and Google+™), (3) networking service providers (e.g., LinkIn® and Manta®), and (4) reviews service providers (e.g., Yelp®, CitySearch®, and CityGrid®). Any entity can create a profile for itself with any such service provider. However, it is equally easy for a first entity to create a profile that misleads others into believing that the source of the created profile is a second different entity. This occurs because some service providers do not verify the profiles that they host. As a result, the first entity can use the created profile to impersonate the second entity online without the second entity's knowledge. In so doing, the first entity can disseminate inaccurate or false information that is attributed back to the second entity, resulting in damage to the actual real-world credibility of the second entity. Furthermore, the unverified profile can be used to perpetrate fraud, identity theft, and other wrongful acts and crimes.

Unverified profiles also exist when service providers automatically create profiles and thereby an online presence for different entities. This occurs, for example, on review sites where a profile is created for a particular entity so that others can comment and post reviews about the particular entity. In such instances, the entities are unaware that these automatically created profiles exist and are therefore unaware of the full extent of their online presence.

An online presence is also based in part on the information that various service providers host about or relating to different entities. This may include information that is presented in association with the profiles that are hosted by the service providers. This may also include information that is not associated with any profile, but is used in conjunction with other informational or promotional services provided by the service providers. For example, a service provider may host a directory of business listings. Some service providers acquire their information from sources other than the entity to which the information references or relates. Moreover, the service providers do not verify the information with the authoritative source who is the entity to which the information references or relates. As a result, the information may be outdated, inaccurate, or falsified. The outdated, inaccurate, or falsified information can damage the entity's credibility and be used to perpetrate fraud, identity thefts and other wrongful acts and crimes.

Yet another issue affecting an entity's online presence is inconsistent information. As a first service provider gains popularity and a second service provider wanes in popularity, an entity may forego updating its information at the second service provider while continuing to update its information at the first service provider. The entity's online presence then includes inconsistent information that can cause confusion amongst those wanting to interact with the entity and missed opportunities as some use the outdated information to contact or learn about the entity.

In summary, one's online presence, real-world credibility, and business dealings are all intertwined such that a negative impact to an entity's online presence can ripple through and affect the entity's credibility and business interactions. Therefore, there is a need for entities to verify their online presence. Specifically, there is a need for a particular entity to verify the profiles that represent that particular entity so as to ensure accuracy of information, to prevent damage to the particular entity's credibility, and to prevent fraud, identity theft, and other wrongful acts and crimes from occurring under the guise of the particular entity. Similarly, there is a need for the particular entity to verify the information that is about or pertaining to the particular entity online to ensure timeliness and accuracy of information as well as to prevent fraud, identity theft, and other wrongful acts and crimes from occurring. However, some entities do not have the time, resources, or expertise to verify their online presence and others are simply unaware of the full extent of their online presence. As such, there is a need to automate such verification. Specifically, there is a need to fully identify an entity's online presence across various service providers and there is further a need to facilitate verification of the profiles and information constituting the online presence with an authoritative source.

SUMMARY OF THE INVENTION

It is an object of the present invention to provide an advocate system to facilitate automated online presence verification for different entities on behalf of the entities. It is an object of the advocate system to place service providers on notice that profiles and information hosted by the service providers that form the online presence for a particular entity should first be verified with that particular entity. It is further an object of the advocate system to directly or indirectly connect the service providers that are placed on notice with the appropriate authoritative entities in order to facilitate the verification of the profiles and information, and thereby facilitate the verification of the online presence for those entities. These objects are intended to avoid potential damage to the particular entity's credibility and to mitigate potential for fraud, identity theft, and other wrongful or criminal acts that may be perpetuated when the particular entity's online presence is hijacked or improperly established or used by another.

To achieve these and other objects, the advocate system is configured to perform entity verification and at least one of three verification processes including: 1) a basic verification process, 2) a selective verification process, and 3) a comprehensive verification process. The advocate system performs the entity verification to verify that an entity is who it claims to be and is therefore the authoritative source (i.e., authoritative entity) to verify profiles and information that comprise the online presence for that entity. The advocate system performs one of the at least three verification processes 1) to verify that the profiles that have been created for the authoritative entity at various service providers were registered by or have been approved by the authoritative entity and 2) to verify that information about or relating to the authoritative entity at various service providers was originated by the authoritative entity or has been verified by the authoritative entity as being truthful and accurate.

The verification performed by the advocate system provides automated means to protect the credibility of the authoritative entity by ensuring profiles and information associated with the online presence of the authoritative entity are accurate and up-to-date. It further allows the authoritative entity to be aware of the scope of its online presence even when some of the profiles and information were originated by someone other than the authoritative entity without the entity's knowledge. Furthermore, the advocate system provides a means with which to centrally monitor and manage the online presence for the authoritative entity such that the advocate system facilitates the verification of the authoritative entity's online presence without the authoritative entity having to engage each service provider that hosts a profile or information constituting the online presence for that authoritative entity.

When performing the basic verification process, the advocate system communicates with various service providers to inform the service providers that any profiles or information they host about or relating to a particular authoritative entity should be verified with that particular authoritative entity. This communication facilitates the verification of the particular authoritative entity's online presence by placing each of the service providers on notice. The notice informs each of the service providers that profiles that are automatically created by the service provider for the particular authoritative entity or profiles that are created by others without the consent of the particular authoritative entity can damage the online presence and real-world credibility of the particular authoritative entity. As a result, these damages can lead to actionable claims of defamation, copyright and trademark infringement, privacy invasion, etc. against the service provider. Moreover, such profiles could be used to perpetrate fraud, identity theft, and other wrongful or criminal acts when the particular authoritative entity's online presence is hijacked or improperly established or used by another. Accordingly, the communication is also notice to the service provider to prevent the profile from being claimed or altered by any entity other than the particular authoritative entity. Should the profile already be claimed by another entity besides the particular authoritative entity, the service provider is put on notice that it should suspend or deactivate the profile to avoid future damage to the credibility of the particular authoritative entity. The notice also informs each of the service providers that information about or relating to the particular authoritative entity that is obtained from sources other than the particular authoritative entity may be outdated, inaccurate, or falsified. Such information can also damage the online presence and real-world credibility of the particular authoritative entity and can lead to actionable claims against the service provider or be used to perpetrate fraud, identity theft, etc.

To further facilitate verification of the particular authoritative entity's online presence, the advocate system may include contact information in the communication passed to the service provider. In some embodiments, the contact information enables a receiving service provider to contact the particular authoritative entity once the service provider is on notice. The service provider can then directly verify with the particular authoritative entity the profiles and information it hosts about or relating to the particular authoritative entity. In some embodiments, the contact information enables the service provider to contact the advocate system which indirectly verifies the profiles and information about or relating to the particular authoritative entity on behalf of the particular authoritative entity. In some embodiments, the advocate system performs a confirmation process to confirm that the online presence for the particular authoritative entity has been verified and to provide a verification badge to the service providers that have verified profiles and/or information with the particular authoritative entity. The verification badge informs others viewing or interacting with a profile or item of information that the profile or item of information has been verified with the proper authoritative entity.

When performing the selective verification process, the advocate system selectively issues the communication to those service providers that are specifically identified to host profiles or information about or relating to a particular authoritative entity. To selectively target the communication, the advocate system queries a set of service providers with one or more verified identifiers that identify the particular authoritative entity. The queries identify a subset of the set of service providers that host profiles and information for the particular authoritative entity. The communication is then passed to the identified subset of service providers to place the subset of service providers on notice and to facilitate the online verification for the authoritative entity. The communication may also be passed to the unverified profiles and to the particular authoritative entity. In some embodiments, the advocate system scrapes profiles and information from the identified subset of service providers and analyzes the information to identify unclaimed profiles and information that is outdated, inaccurate, or falsified. This identification may be accomplished by cross comparing the scraped profiles and information from different service providers. In some embodiments, a separate communication may be passed to the particular authoritative entity to identify, for the particular authoritative entity, its online presence, and more specifically, each service provider that hosts a profile or information about or relating to the particular authoritative entity.

When performing the comprehensive verification process, the advocate system maintains a central repository that each authoritative entity populates with a list of profiles and information that it has verified for various service providers. The advocate system accesses the various service providers to identify which service providers host profiles and information about or relating to a particular authoritative entity. In some embodiments, the advocate system scrapes profile and information from each identified service provider site to compare against the verified profile list and verified information that is stored in the central repository. The advocate system identifies inconsistencies between the scraped data and the verified data in the central repository. Any such inconsistency may be representative of an unverified profile or unverified information. Accordingly, when an inconsistency is identified, the advocate system passes a communication to the hosting service provider to place the service provider on notice. By specifically identifying the inconsistency in the communication system, the advocate system facilitates more targeted verification of the particular authoritative entity's online presence. The communication may include contact information to enable the service provider to contact the particular authoritative entity or the advocate system to complete the verification for the identified inconsistency. In some embodiments, the advocate system provides the verified profile list or verified information in the communication to further facilitate verification for the online presence of the particular authoritative entity. In some such embodiments, the service provider may use the verified profile list or verified information in the communication to replace or update an unverified profile or unverified information that it hosts. In this verification process, the authoritative entity verifies a profile list and information once with the advocate system and the advocate system automatically monitors and manages the online presence for the authoritative entity by using the provided profile list and verified information to verify profiles and information that comprise the online presence for the authoritative entity at various service providers.

BRIEF DESCRIPTION OF THE DRAWINGS

In order to achieve a better understanding of the nature of the present invention a preferred embodiment of the advocate system systems and methods will now be described, by way of example only, with reference to the accompanying drawings in which:

FIG. 2 presents an interface for initiating entity verification in accordance with some embodiments.

FIG. 3 presents an interface for selection of an entity record in accordance with some embodiments.

FIG. 5B provides an example of the notice that is provided to one or more service providers hosting an unverified online presence of an entity.

FIG. 12 illustrates a computer system with which some embodiments are implemented.

DETAILED DESCRIPTION OF THE INVENTION

Figure 1:
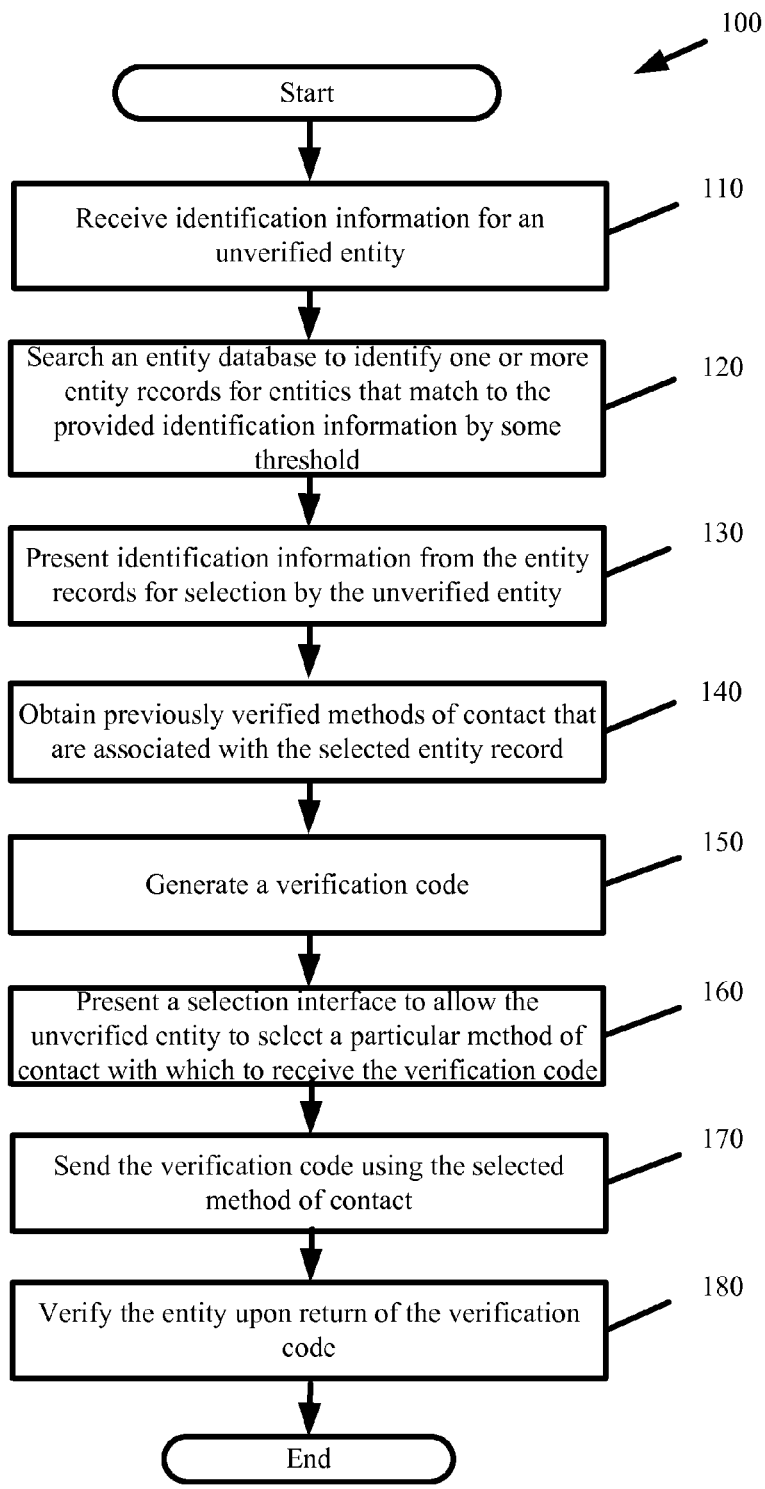
FIG. 1 presents a process for performing entity verification in accordance with some embodiments.

In the following detailed description, numerous details, examples, and embodiments for an advocate system are set forth and described. As one skilled in the art would understand in light of the present description, the advocate system is not limited to the embodiments set forth, and the advocate system may be practiced without some of the specific details and examples discussed. Also, reference is made to the accompanying figures, which illustrate specific embodiments in which the advocate system can be practiced. It is to be understood that other embodiments can be used and structural changes can be made without departing from the scope of the embodiments herein described.

To facilitate the discussion, a service provider is any online or Internet based service that hosts profiles with which entities can establish an online presence for the purpose of disseminating information or communicating with others. A service provider can also be any online or Internet based service that hosts information about or relating to different entities, where such information can be used by others to learn, share experiences, or comment about different entities. Many such service providers do not verify the profiles or information that they host. It may therefore be the case that a first entity fraudulently creates a profile for a second entity. For example, the first entity creates the profile "Dun & Bradstreet Credibility Corp." when the first entity is not an agent, representative, or in any way affiliated with Dun & Bradstreet Credibility Corp.™ The first entity can then damage the credibility of the second entity by disseminating outdated, false, or inaccurate information from the created profile without the second entity's knowledge.

Some service providers also automatically generate profiles or information for a particular entity without the particular entity's knowledge or consent in order to allow others to post reviews and experiences they have had with that particular entity. The automatically generated profiles or information are sometimes populated with unverified information that is outdated, inaccurate, or falsified and that is obtained from sources other than the entity that the profiles or information relate to.

Twitter, Facebook, Google+, Yelp, CitySearch, Manta, TripAdvisor®, and LiveJournal® are representative of some service providers that may host unverified profiles and unverified information. It should be apparent that the above listing is presented for exemplary purposes and is not intended to be an exhaustive listing of service providers and that other service providers may host unverified profiles or unverified information.

An entity record database is a database that is operated and maintained by an information aggregator. The information aggregator aggregates and verifies data pertaining to entities including businesses and individuals. An entity record of the entity record database may store verified identification information (e.g., business names or individual names), verified names of principals for a business, verified street addresses, verified email addresses, and verified telephone numbers that are associated with an entity. Techniques for obtaining and verifying such data are well established, well known in the art, and in use by information aggregators such as the Dun & Bradstreet Corporation. The entity records can also be populated with other verified information such as financial records, credit history, legal history, etc. The entity records are commonly used by credit reporting agencies (e.g., Dun &

Bradstreet, TransUnion®, etc.), financial reporting agencies (e.g., EDGAR, US Securities and Exchange Commission, etc.), regulatory agencies (e.g., Secretary of State), and other agencies (e.g., the Better Business Bureau®) to facilitate various commercial transactions (e.g., lending credit, identifying creditworthiness, identifying trade references, etc.). In some embodiments, the entity record database is operated and maintained by the advocate system or a third party that the advocate system has an established partnership with.

I. Overview

Due to the ever increasing reliance on digital communications, online information, and online interactivity, an entity's online presence has an increasingly greater impact to its real-world credibility. In turn, this impact can positively or negatively affect the perception, growth, success, and business prospects of the entity.

Despite the importance that an entity's online presence has to the real-world credibility of that entity, many service providers hosting the entity's online presence do so without verifying that online presence as actually belonging to or being managed by the entity and not by another disseminating false, inaccurate, or outdated information. Consequently, part of an entity's online presence may be hijacked by another in order to perpetrate fraud, identify theft, and other wrongful or criminal acts in the name of an entity without the entity's knowledge. It is therefore important for the entity to verify its online presence by continually monitoring and managing the profiles and information at different service providers from which the entity's online presence is formed.

Manual online presence monitoring and management is complicated because of the sheer volume of profiles and information that form an entity's online presence. Specifically, several service providers host profiles for the entity and host information about or relating to the entity. Some of these profiles may be created by the entity, whereas others can be automatically or manually generated without the entity's knowledge. Also, some of the information may be sourced from the entity, whereas other information is aggregated or obtained from other sources unrelated to the entity. Further still, the entity may begin to ignore some of the profiles it created as some service providers wane in popularity and others gain in popularity. This can lead to some service providers hosting outdated or stale information that is inconsistent with the information hosted by other service providers. Consequently, the entity may be unaware of the full scope of its online presence while other entities simply do not have the time, resources, or expertise to verify the profiles and information that constitute their online presence.

Accordingly, some embodiments provide an advocate system that facilitates automatic verification for the online presence of a particular entity across different service providers. The advocate system performs entity verification to verify that an entity is who it claims to be and is thus the authoritative source or authoritative entity for verifying profiles and information that form the online presence for that entity. The advocate system then performs one or more verification processes to facilitate online presence verification.

In some embodiments, the verification processes include: a basic verification process, a selective verification process, and a comprehensive verification process. Each verification process provides a different degree of online presence verification 1) to verify that the profiles that have been created for the authoritative entity at various service providers were registered by or have been approved by the authoritative entity and 2) to verify that information about or relating to the authoritative entity at various service providers was originated by the authoritative entity or has been verified by the authoritative entity as being truthful and accurate.

The verification process facilitates automatic online presence verification by providing notice to each of the service providers that host a profile or information contributing to the online presence for that authoritative entity. In some embodiments, the verification process further facilitates automatic online presence verification by directly or indirectly connecting the service providers that are placed on notice with the appropriate authoritative entities. When the advocate system facilitates a direct connection, the service provider can contact the authoritative entity in order to directly verify with the authoritative entity the profiles and/or information that the service provider hosts for that authoritative entity. When the advocate system facilitates an indirect connection, the advocate system performs the verification of the profiles and/or information for the authoritative entity on behalf of the authoritative entity. In some embodiments, the verification process further facilitates automatic online presence verification by providing a verified profile list and/or verified information from a central repository to a service provider for use by the service provider to replace or update an unverified profile or unverified information that is hosted by the service provider.

II. Entity Verification

FIG. 1 presents a process 100 for performing entity verification in accordance with some embodiments. Entity verification is performed in conjunction with online presence verification because, by verifying an entity, the advocate system identifies the authoritative source or authoritative entity for verifying profiles and information that comprise the online presence for that entity.

The process begins when the advocate system receives (at 110) identification information for an unverified entity. In some embodiments, the unverified entity submits the identification information to the advocate system by directing a web browser or other application to a webpage of the advocate system and providing the requested information on the webpage.

FIG. 2 presents an interface 210 for initiating entity verification in accordance with some embodiments. As shown, the interface 210 requests that the unverified entity enter identification information including a name or email address. In some embodiments, the interface 210 may be modified to allow the entity to enter alternate identification information such as a telephone number, mailing address, URL, etc.

When the identification information is received, the process searches (at 120) an entity database to identify one or more entity records for entities that match to the provided identification information by some threshold. As described above, the entity database is a database storing entity records that each comprise information that was previously verified for various entities using well established processes such as those used by the Dun & Bradstreet Corporation. More than one entity record may be identified when different entities share the same name. For example, multiple businesses in different geographic regions may share the same name.

When more than one entity record is identified, the process presents (at 130) identification information from the entity records for selection by the unverified entity and the unverified entity selects the entity record that identifies itself. FIG. 3 presents an interface 310 for selection of an entity record in accordance with some embodiments.

Figure 4:
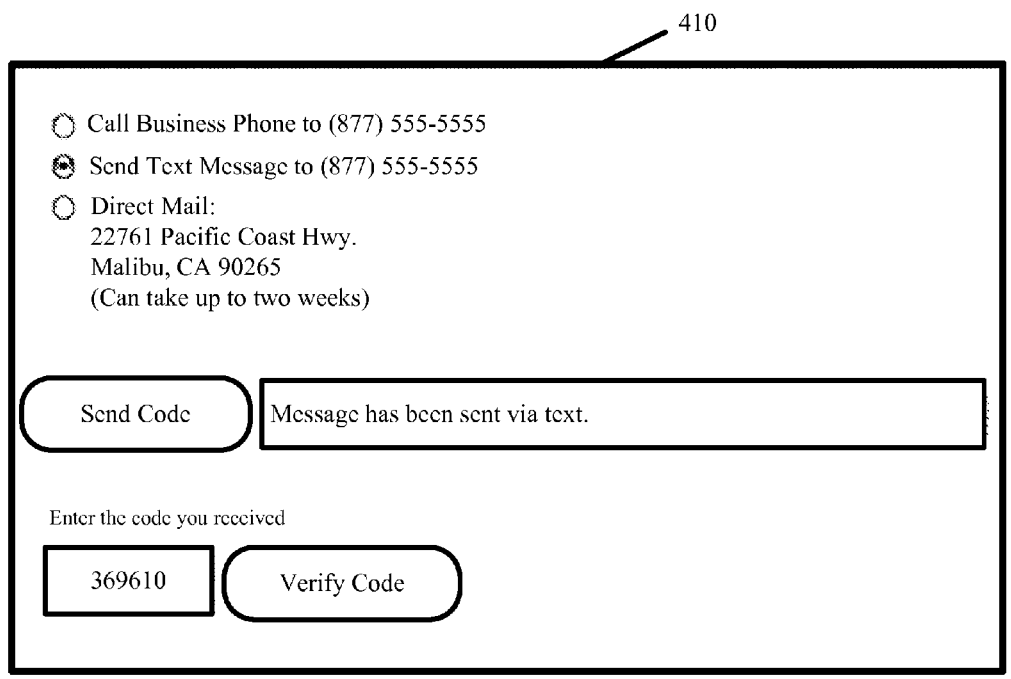
FIG. 4 presents an interface for selection of a method with which to provide the verification code to the unverified entity and for receiving the verification code in accordance with some embodiments.

When an entity record is selected, the process obtains (at 140) the previously verified methods of contact that are associated with the selected entity record and a verification code is generated (at 150) to verify that the unverified entity is actually the entity identified by the selected entity record. A selection interface allows (at 160) the unverified entity to select a particular method of contact with which to receive the verification code. The actual contact information from the entity record may also be presented or partially or wholly occluded. FIG. 4 presents an interface 410 for selection of a method with which to provide the verification code to the unverified entity and for receiving the verification code in accordance with some embodiments.

The process sends (at 170) the verification code using the selected method of contact. The process then verifies (at 180) the entity upon return of the verification code. When the advocate system identifies an authoritative entity, the advocate system next performs one or more verification processes to verify the online presence for that entity.

Since the verification code is sent using a method of contact that was previously verified for the entity, an unverified entity that is attempting to fraudulently verify itself as another will be unable to receive and return the verification code and will thus be unable to verify itself as another. U.S. patent application Ser. No. 13/290,731 entitled "Automated Entity Verification" filed on Nov. 7, 2011 provides additional detail for performing automated entity verification and the contents of application Ser. No. 13/290,731 are incorporated herein by reference.

III. Basic Verification Process

Figure 5A:
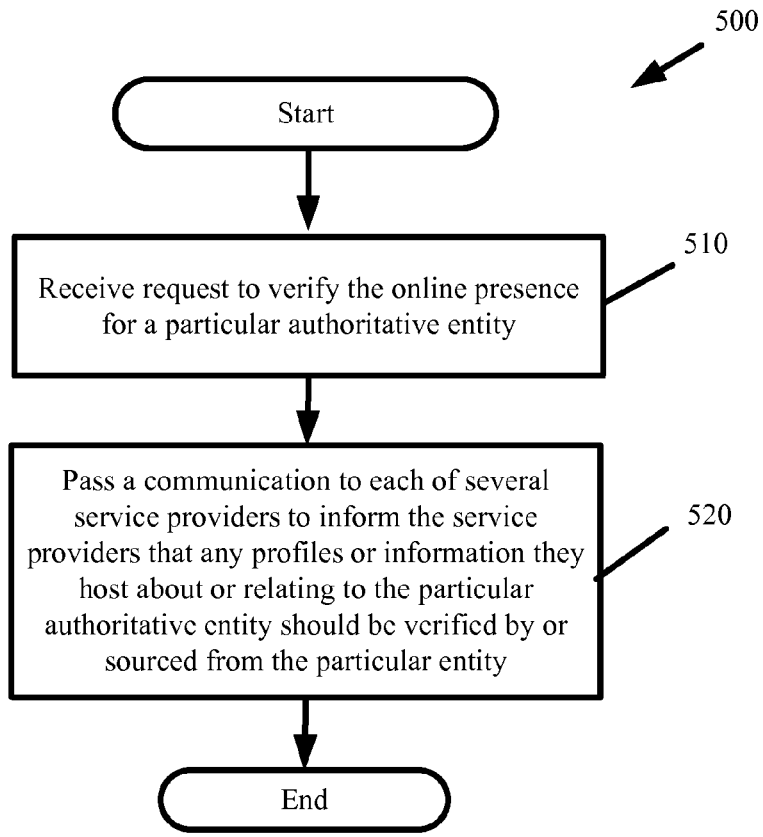
FIG. 5A presents a process performed by the advocate system to perform basic online presence verification in accordance with some embodiments.

FIG. 5A presents a process 500 performed by the advocate system to perform basic online presence verification in accordance with some embodiments. The process 500 commences by receiving (at 510) a request to verify the online presence for a particular authoritative entity. In other words, the process commences by receiving (at 510) a request to verify the online presence for an entity that has been verified to be the authoritative source or authoritative entity for the profiles and information that comprise the online presence. In some embodiments, the particular authoritative entity is identified by performing the entity verification process 100 of FIG. 1 prior to or in combination with the process 500. Accordingly, the process 500 may be modified to perform steps 110-180 of process 100 prior to performing step 510 of process 500.

In some embodiments, the request to verify the online presence may be submitted when an entity accesses a graphical user interface of the advocate system and provides basic identification information to identify itself as part of commencing the entity verification process or as part of commencing the online presence verification separate from entity verification. Additionally or alternatively, the particular authoritative entity may initiate the request by calling and speaking to an agent of the advocate system. Additionally or alternatively, the advocate system may initiate the request by obtaining contact information of the particular authoritative entity, contacting the particular authoritative entity based on the obtained contact information, and receiving confirmation from the particular authoritative entity that it desires to have its online presence verified. This may be accomplished via electronic correspondence (e.g., email), mail correspondence, or by the advocate system directly contacting the particular authoritative entity with a telephone call having a series of automated prompts or with a live agent placing the telephone call.

Next, the process passes (at 520) a communication to a set of service providers to facilitate the verification for the online presence of the particular authoritative entity. The communication to the set of service providers may be passed as an electronic correspondence (e.g., email), physical correspondence (e.g., mailed letter), or a telephone call with a prerecorded message or a live agent. In some embodiments, the set of service providers is configured to the system. In some other embodiments, the system actively queries several service providers using identification information of the entity to identify which of the service providers host an online presence of the entity.

The communication serves to place each service provider of the set of service providers on notice. The notice informs each of the service providers that unverified profiles and unverified information they host or present about or relating to the particular authoritative entity can damage the online presence and real-world credibility of the particular authoritative entity. This damage can potentially lead to actionable claims of defamation, copyright and trademark infringement, privacy invasion, etc. against the service provider. Additionally or alternatively, the notice informs each of the service providers that unverified profiles and unverified information they host and present about or relating to the particular authoritative entity can be used to perpetrate fraud, identity theft, and other wrongful or criminal acts when the particular authoritative entity's online presence is hijacked or improperly established or used by another.

The notice facilitates verification of the particular authoritative entity's online presence by eliciting different actions from one or more of the service providers. With specific reference to unverified profiles that are hosted and presented by the set of service providers, the notice informs each service provider that they are responsible for representations and communications that are made from an unverified profile, where the source of the profile is represented as the particular authoritative entity. As noted above, an unverified profile that identifies the particular authoritative entity as the source but is in use by another can result in representations and communications that damage the credibility of the particular authoritative entity and can be used to perpetrate fraud and identity theft. The elicited actions resulting from the notice may involve the service providers verifying the unverified profiles with the appropriate authoritative entities before allowing further use of the profiles. The action may involve the service providers preventing non-authoritative entities from claiming or altering unclaimed profiles. The action may involve the service providers suspending or deactivating profiles that have been created for the particular entity and that have been claimed by non-authoritative entities, unless those profiles are verified by the authoritative entity.

With specific reference to unverified information that is hosted or presented by the set of service providers, the notice informs each service provider that information about or relating to the particular authoritative entity that is obtained from sources other than the particular authoritative entity may be outdated, inaccurate, or falsified. Such unverified information can damage the credibility of the particular authoritative entity and can be used to perpetrate fraud and identity theft. The notice facilitates verification of the particular authoritative entity's online presence by eliciting action in the form of a service provider removing unverified information until it is verified with the particular authoritative entity.

FIG. 5B provides an example of the notice that is provided to one or more service providers hosting an unverified online presence of an entity. It should be apparent to one of ordinary skill in the art that the notice of FIG. 5B is exemplary and the notice can be modified as needed.

To further facilitate the verification of the online presence for the particular authoritative entity, the advocate system may include contact information in the communication that is passed to the service providers. In some embodiments, the contact information enables a receiving service provider to establish contact with the entity that is authoritative for the online presence being verified. The service provider can then directly verify with the particular authoritative entity the profiles and information it hosts about or relating to the particular authoritative entity. The contact information may be obtained from the entity record of the entity database that is associated with the particular authoritative entity and that is identified when verifying the entity in accordance with process 100 described above. The contact information may include the contact information used as part of the method of contact for sending the verification code to the entity when performing entity verification. In some embodiments, the contact information enables the service provider to contact the advocate system in order for the advocate system to indirectly verify the profiles and information about or relating to the authoritative entity on behalf of the particular authoritative entity.

Figure 6:
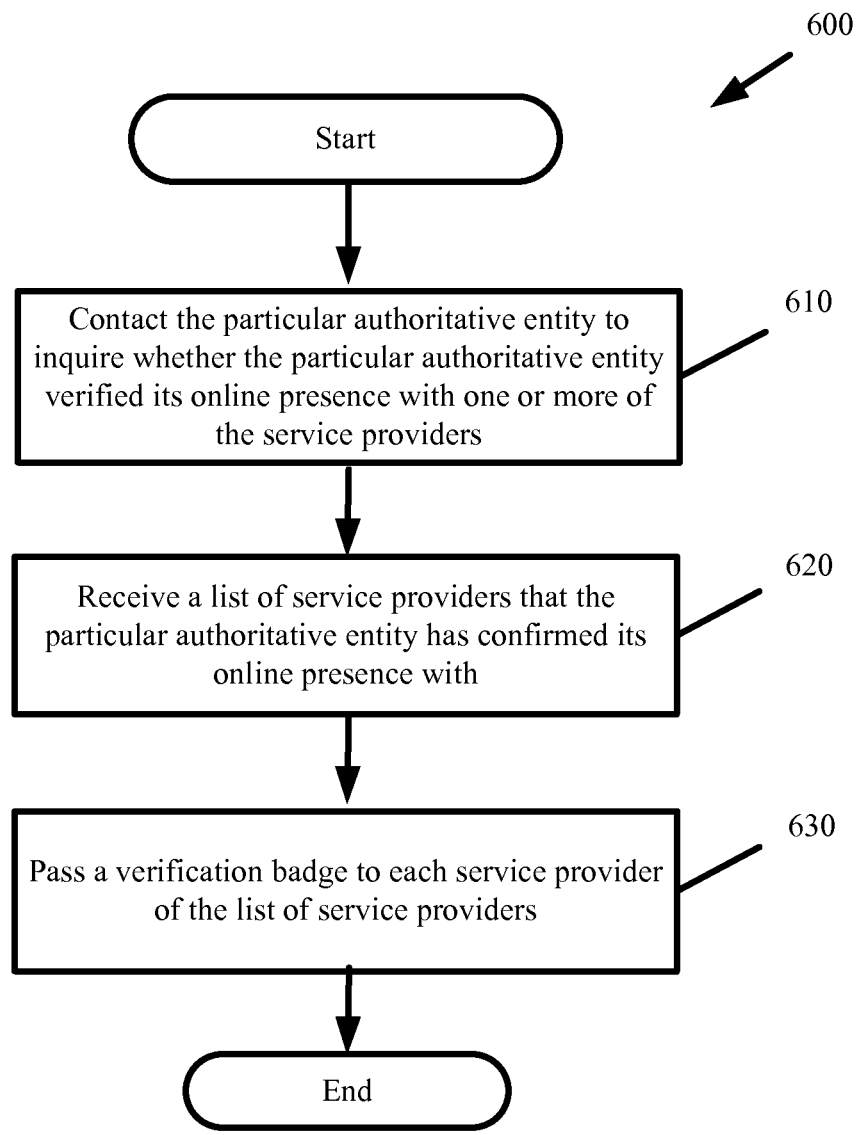
FIG. 6 presents a process for confirming that the online presence for the particular authoritative entity has been verified in accordance with some embodiments.

In some embodiments, the advocate system confirms that the online presence for the particular authoritative entity has been verified as a result of performing the basic online presence verification of FIG. 4 or other verification process described below with reference to FIGS. 7-10. FIG. 6 presents a process 600 for confirming that the online presence for the particular authoritative entity has been verified in accordance with some embodiments. The process 600 may be performed at the completion of process 500. Specifically, some period of time after passing the communication to the service providers at step 520, the process 600 contacts (at 610) the particular authoritative entity to inquire whether the particular authoritative entity verified its online presence with one or more of the service providers. The process contacts the particular authoritative entity using contact information that it obtains from the proper entity record or using contact information that was included in the communication to the service providers to enable the service providers to contact the entity. The contact may be conducted via email, telephone call, text message, etc.

In return, the process receives (at 620) a list of service providers that the particular authoritative entity has confirmed its online presence with. In other words, the process receives a list of service providers that the particular authoritative entity has confirmed to host verified profiles or verified information.

Next, the process passes (at 630) a verification badge to each service provider of the list of service providers. The service providers can present the verification badge adjacent to or in conjunction with the profiles and information that have been verified for the particular authoritative entity. The verification badge informs others that the profiles and information hosted for the particular authoritative entity have been verified by that particular authoritative entity. Accordingly, others interacting with a verified profile, as indicated by a verification badge, can be assured that they are interacting with the particular authoritative entity. Similarly, others viewing verified information, as indicated by a verification badge, can be assured that the timeliness and accuracy of that information has been verified with the appropriate authoritative entity.

In some embodiments, the verification badges display an expiration time or date to ensure that the profiles and information are regularly verified and thereby kept up-to-date. In some embodiments, a verification badge is passed to the entity whose online presence has been verified. The entity can display the verification badge on its website so that others appreciate that the online presence for that entity has been verified and is therefore not the subject of fraud or identity theft and that the information presented therewith is timely and accurate.

IV. Selective Verification Process

The selective verification process facilitates targeted online presence verification by selectively issuing the communication to those service providers that are known to host profiles or information about or relating to an authoritative entity. In some embodiments, the selective verification process identifies for an authoritative entity which service providers host profiles and/or host information about or relating to the authoritative entity. The authoritative entity is then better able to appreciate the scope of its online presence and where specific issues may lie. In some embodiments, the selective verification process identifies information that is inconsistent, outdated, inaccurate, or falsified.

Figure 7:
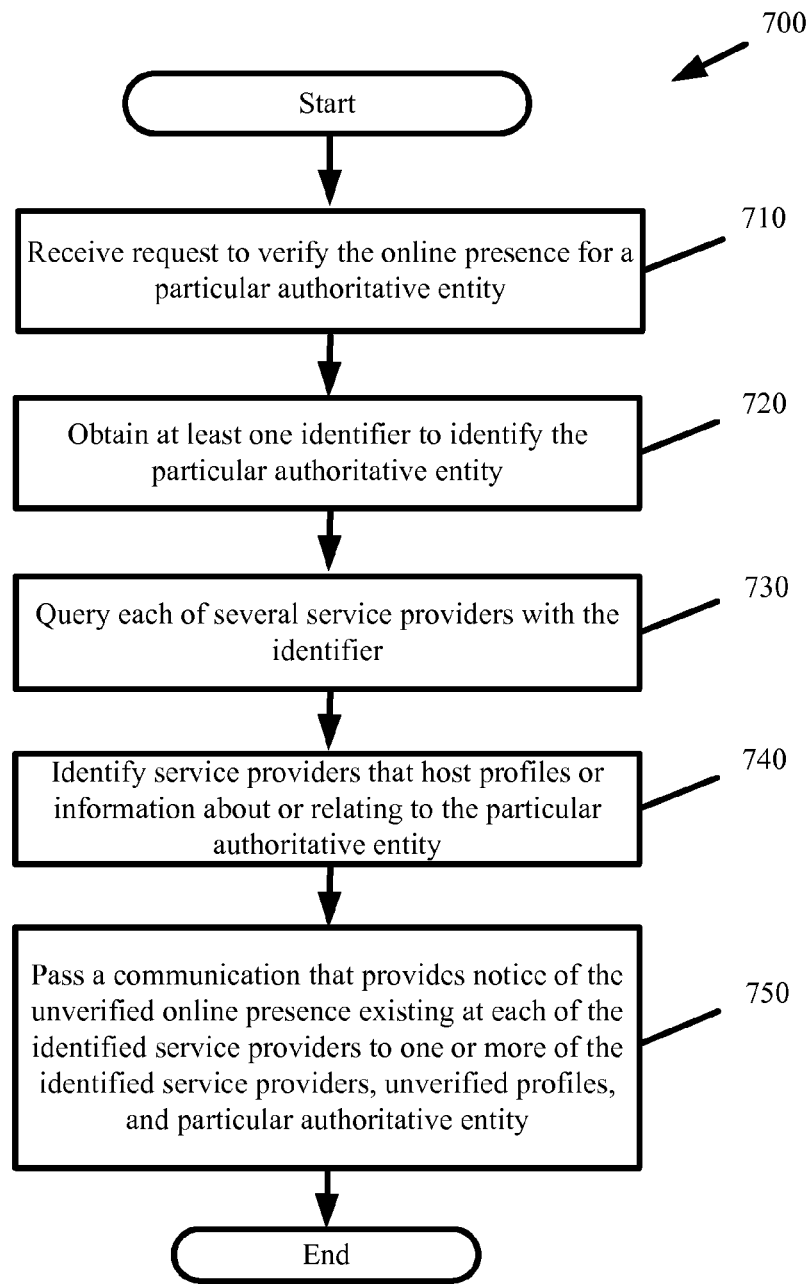
FIG. 7 presents a process performed by the advocate system to perform selective online presence verification in accordance with some embodiments.

FIG. 7 presents a process 700 performed by the advocate system to perform selective online presence verification in accordance with some embodiments. The process 700 commences by receiving (at 710) a request to verify the online presence for a particular authoritative entity. As noted above, the particular authoritative entity may be identified by performing the entity verification process 100 of FIG. 1 prior to or in combination with the process 700.

Next, the process obtains (at 720) one or more identifiers that identify the particular authoritative entity. The identifiers may be obtained from the entity when initiating the verification request or from an entity record of the entity database that is identified when performing entity verification. The identifiers may include one or more of the particular entity's name, email address, mailing address, telephone number, and other such information.

The process queries (at 730) each of several service providers with the identifiers to identify (at 740) a subset of the service providers that host profiles or information about or relating to the particular authoritative entity. For example, each of the service providers Facebook, Yelp, and Manta provide a search interface for identifying profiles or information about or relating to an entity. When an identifier is entered in one such interface and the query is submitted, the service provider returns zero or more profiles that contain data matching the entered identifier by some threshold degree. Alternatively, the service provider may return information matching to the entered identifier by some threshold degree.

The process then passes (at 750) a communication that provides notice of the unverified online presence existing at each of the identified service providers to one or more of the identified service providers, unverified profiles, and particular authoritative entity. The communication may include contact information to enable a receiving party to directly or indirectly contact the particular authoritative entity for verification of unverified profiles and information.

By passing the communication to the unverified profile in addition to or instead of the service providers, the advocate system places profile hijackers and potential perpetrators of fraud or identify theft on notice that the particular authoritative entity has not verified the profile and therefore has not authorized usage of the profile on its behalf. Accordingly, these parties will be responsible for any damages that result from the unverified usage of the profile.

By passing the communication to the particular authoritative entity, the advocate system allows the entity to better understand its online presence. In so doing, the communication reveals service providers that host an online presence of the particular authoritative entity without the particular authoritative entity having known of the existence of that online presence. This in turn enables the particular authoritative entity to take targeted action to resolve issues impacting its online presence.

Figure 8:
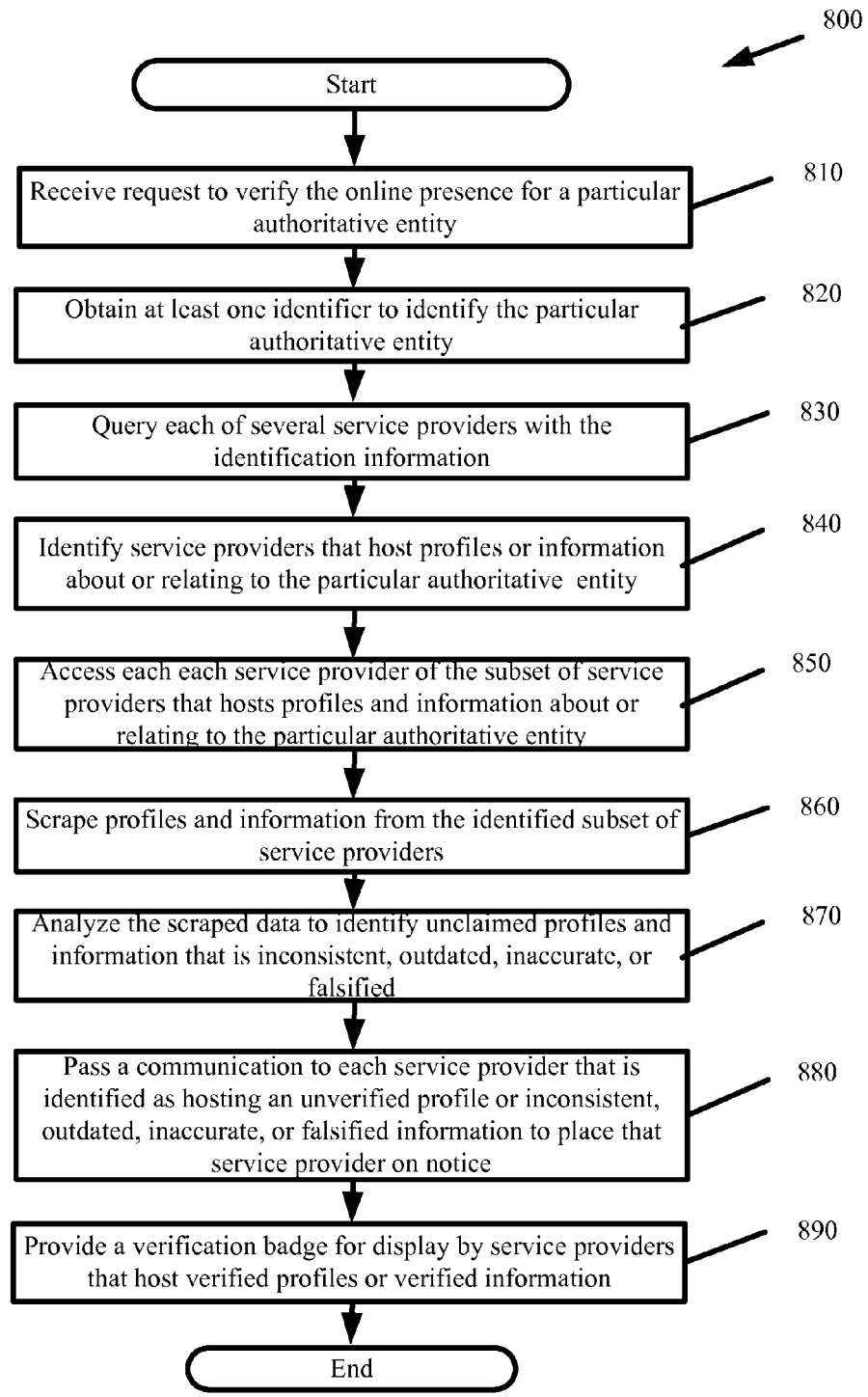
FIG. 8 presents a process for alternatively performing selective online presence verification in accordance with some embodiments.

FIG. 8 presents a process 800 for alternatively performing selective online presence verification in accordance with some embodiments. Steps 810-840 are the same as steps 710-740 described above with reference to FIG. 7. Once the process 800 identifies (at 840) the subset of service providers that host profiles or information about the particular authoritative entity, the process accesses (at 850) a site where each service provider of the subset of service providers hosts profiles and information about or relating to the particular authoritative entity. The process then scrapes (at 860) the profiles and information from the identified subset of service providers and the process analyzes (at 870) the scraped data to identify unclaimed profiles and information that is inconsistent, outdated, inaccurate, or falsified.

Unclaimed profiles may be identified by adjacent placement of a link for claiming the profile. Inconsistent, outdated, inaccurate, or falsified information may be identified by cross-comparing the information scraped from each service provider or by comparing timestamps associated with the scraped information. For example, the process may identify an inconsistency when information about a particular entity that is scraped from a first service provider identifies a first address for that particular entity and information about the particular entity that is scraped from a second service provider identifies a second address for that particular entity.

The process passes (at 880) a communication to each service provider that is identified as hosting an unverified profile or inconsistent, outdated, inaccurate, or falsified information. The communication may also identify for the service provider, the profile or information that needs to the verified with the particular authoritative entity. The communication may include contact information to enable a receiving service provider to directly or indirectly contact the particular authoritative entity for verification of unverified profiles and information. As noted above with reference to FIG. 7, the communication may also selectively be passed to the registrants of unverified accounts and to the particular authoritative entity.

In some embodiments, the advocate system performs the confirmation process 600 of FIG. 6 after either selective online verification process of FIG. 7 and FIG. 8. As described above, the confirmation process confirms that the online presence for the particular authoritative entity has been verified and verification badges may be provided to service providers to reflect the verified online presence.

V. Comprehensive Verification Process

When performing the comprehensive verification process, the advocate system verifies the profiles and information that constitute the online presence for an entity on behalf of the entity. As part of the comprehensive verification process, the advocate system maintains a central repository. Entities that are verified to be the authoritative source for their respective online presence (i.e., authoritative entities) populate the central repository with a list of verified profiles and verified information that they wish to have disseminated and presented consistently across different service providers that host profiles and information forming an online presence for those authoritative entities. The advocate system is then tasked with identifying the service providers that host the profiles and information forming the online presence for a given authoritative entity and to verify the hosted profiles and information against the list of profiles and information that are entered to the central repository by that authoritative entity. In this manner, the authoritative entity need only provide a list of verified profiles and verified information to the central repository of the advocate system and the advocate system seeks out and verifies profiles and information hosted by various providers without the authoritative entity needing to have any knowledge of the service providers and without the authoritative entity verifying profiles or information at each service provider independently.

Figure 9:
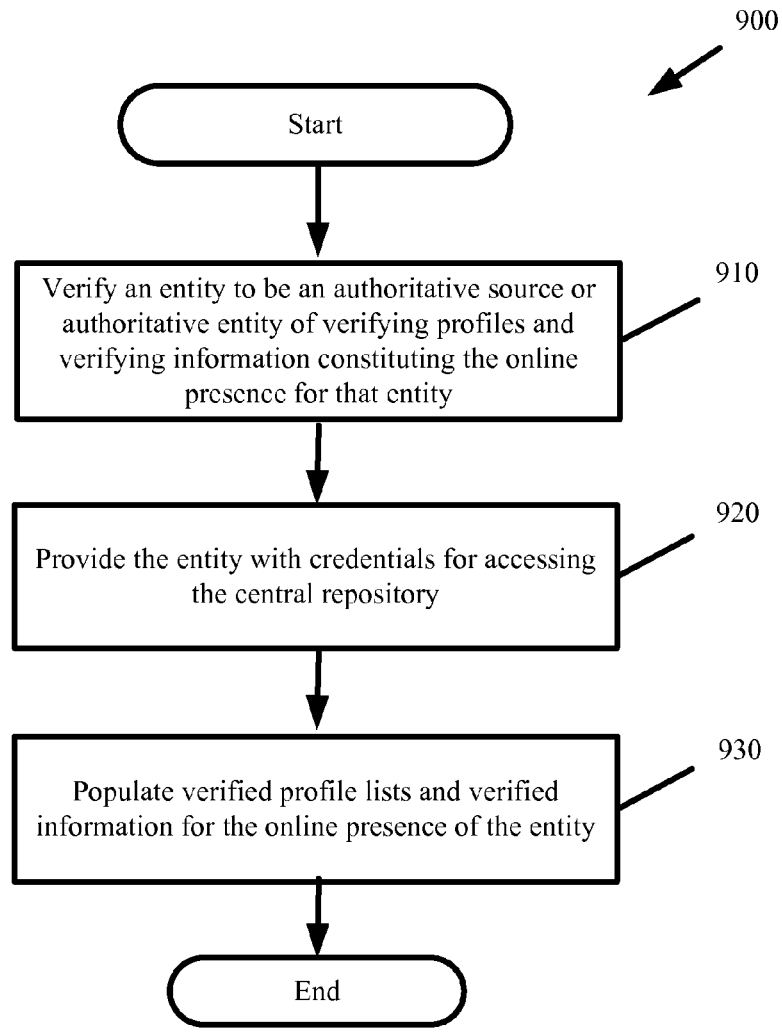
FIG. 9 presents a process for populating the central repository with verified profile lists and information in accordance with some embodiments.

FIG. 9 presents a process 900 for populating the central repository with verified profile lists and information in accordance with some embodiments. The process 900 begins by verifying (at 910) an entity to be an authoritative source or authoritative entity of verifying profiles and verifying information constituting the online presence for that entity. Accordingly, the process may perform the above described entity verification process 100 to verify the entity at 910. Once verified, the process provides (at 920) the entity with credentials for accessing the central repository in order to populate the central repository with the verified profile lists and verified information for its online presence. The credentials may include a username and password or other secure form of identifying the entity. The entity can then access the central repository when desired and the process can securely populate (at 930) verified profile lists and verified information for the online presence of the entity.

Figure 10:
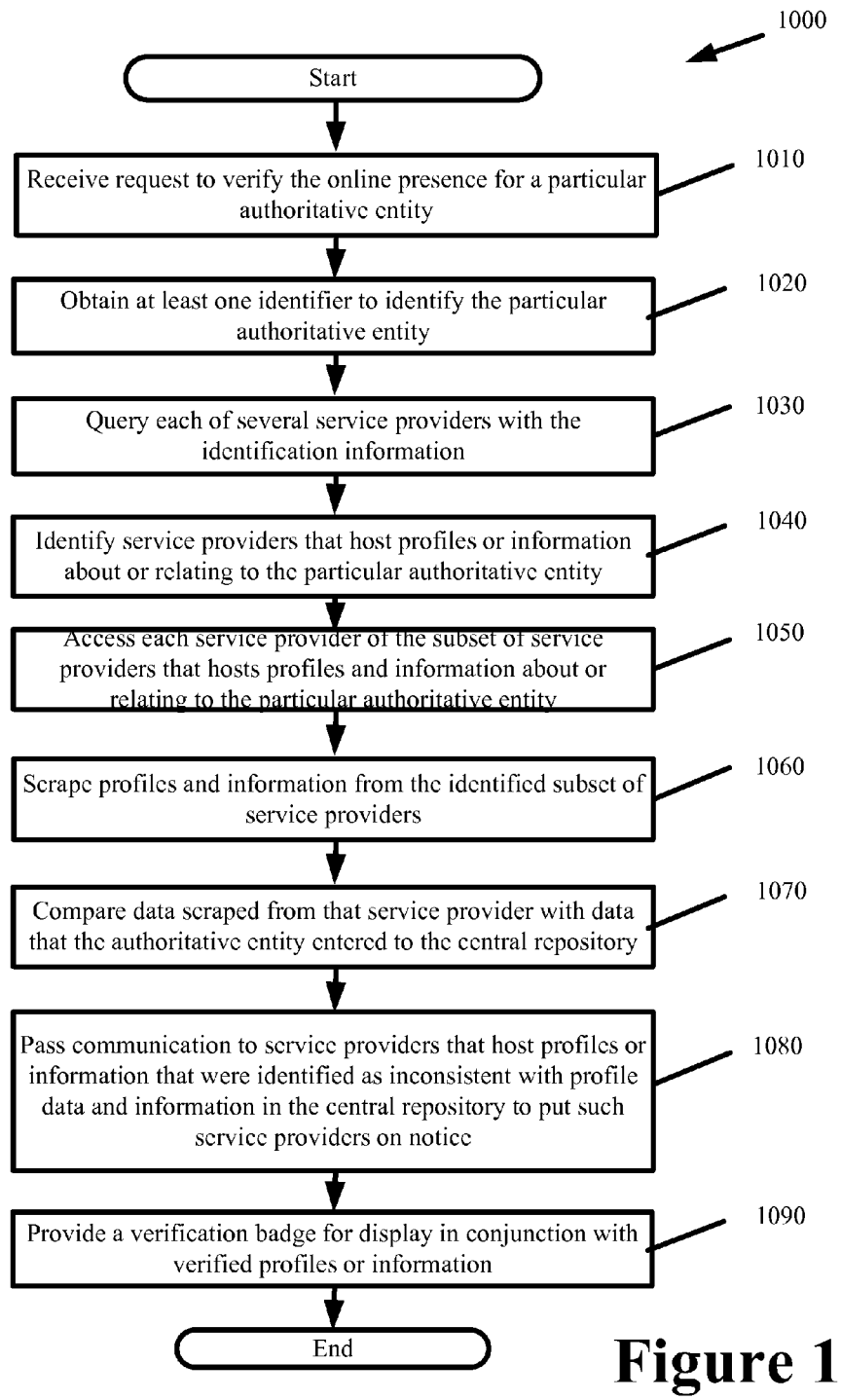
FIG. 10 presents a process performed by the advocate system to perform comprehensive online presence verification in accordance with some embodiments.

FIG. 10 presents a process 1000 performed by the advocate system to perform comprehensive online presence verification in accordance with some embodiments. The process 1000 commences with steps 1010, 1020, 1030, 1040, 1050, and 1060 that mirror steps 810, 820, 830, 840, 850, and 860 of FIG. 8, wherein the process receives (at 1010) a request to verify the online presence for a particular authoritative entity, obtains (at 1020) one or more identifiers to identify the particular authoritative entity, queries (at 1030) each of several service providers to identify (at 1040) which service providers host profiles or information about or relating to the particular authoritative entity, and accesses (at 1050) a site for each identified service provider in order to scrape (at 1060) profile and information about or relating to the particular authoritative entity from the identified service providers. As noted above, the particular authoritative entity may be identified by performing the entity verification process 100 of FIG. 1 prior to or in combination with the process 1000.

For each service provider that is identified to host a profile or information for the particular authoritative entity, the process compares (at 1070) the data scraped from that service provider with data that the particular authoritative entity entered to the central repository. Specifically, if a service provider is found to host a profile for the particular authoritative entity, the advocate system checks the central repository to determine if the profile at the service provider is one the particular authoritative entity identified in the verified list of profiles. If not, the profile may be one that the particular authoritative entity did not create, was created automatically by the service provider, was created by another entity attempting to impersonate the particular authoritative entity, or is a profile that is unknown to the particular authoritative entity. Similarly, if a service provider hosts information about or relating to the particular authoritative entity, the advocate system checks the central repository to determine if the information hosted by the service provider conforms with the verified information provided by the particular authoritative entity. This may include checking spelling of names, confirming identification information (e.g., telephone numbers, addressing, URLs, etc.), and confirming other information including company information, financial information, historic information, etc.

The process passes (at 1080) the communication to service providers that host profiles or information that did not conform with the verified profile list and verified information in the central repository in order to put such service providers on notice. In some embodiments, the advocate system facilitates the verification of the hosted data by including in the communication a notification to inform the service provider that the advocate system has been authorized by the authoritative entity to verify the online presence of the authoritative entity on behalf of the authoritative entity. In some embodiments, the communication notifies the service provider that a hosted profile has not been verified by the authoritative entity and that the profile should be suspended or deactivated. In some embodiments, the communication claims an unclaimed profile for the particular authoritative entity when one such profile is found at a service provider receiving the communication. In some embodiments, the communication includes the verified information from the central repository for the service provider to use in updating its hosted information. In some embodiments, the communication includes contact information to allow the service provider to contact the advocate system to verify hosted information or to obtain verified information from the central repository. In some embodiments, the advocate system facilitates the verification of the hosted data by using login credentials provided by the authoritative entity to directly access and modify the hosted information at each service provider. The login credentials may be provided by the authoritative entity when populating the central repository with the list of verified profiles and verified information.

For service providers that host a verified profile or verified information, the process provides (at 1090) a verification badge for display in conjunction with that profile or information. Others seeing the verification badge at the service provider site can be assured that the proper authoritative entity has verified the profile or information that is hosted by that service provider. Accordingly, the identity of the profile is assured as well as the accuracy and timeless of the information being presented.

This methodology can also be used by an entity to update its online presence across different service providers by simply providing the update to the central repository and then relying on the advocate system to disseminate that update on behalf of the entity to the various service providers hosting the online presence of the entity. For instance, the entity logs in to the advocate system and enters updated and verified information to the central repository. Process 1000 can then be run with the newly updated and verified information. Wherever an online presence of the entity is identified at a service provider that does not include the newly updated and verified information, the process can send a notice to the service provider to update the online presence of the entity.

VI. Advocate System

Figure 11:
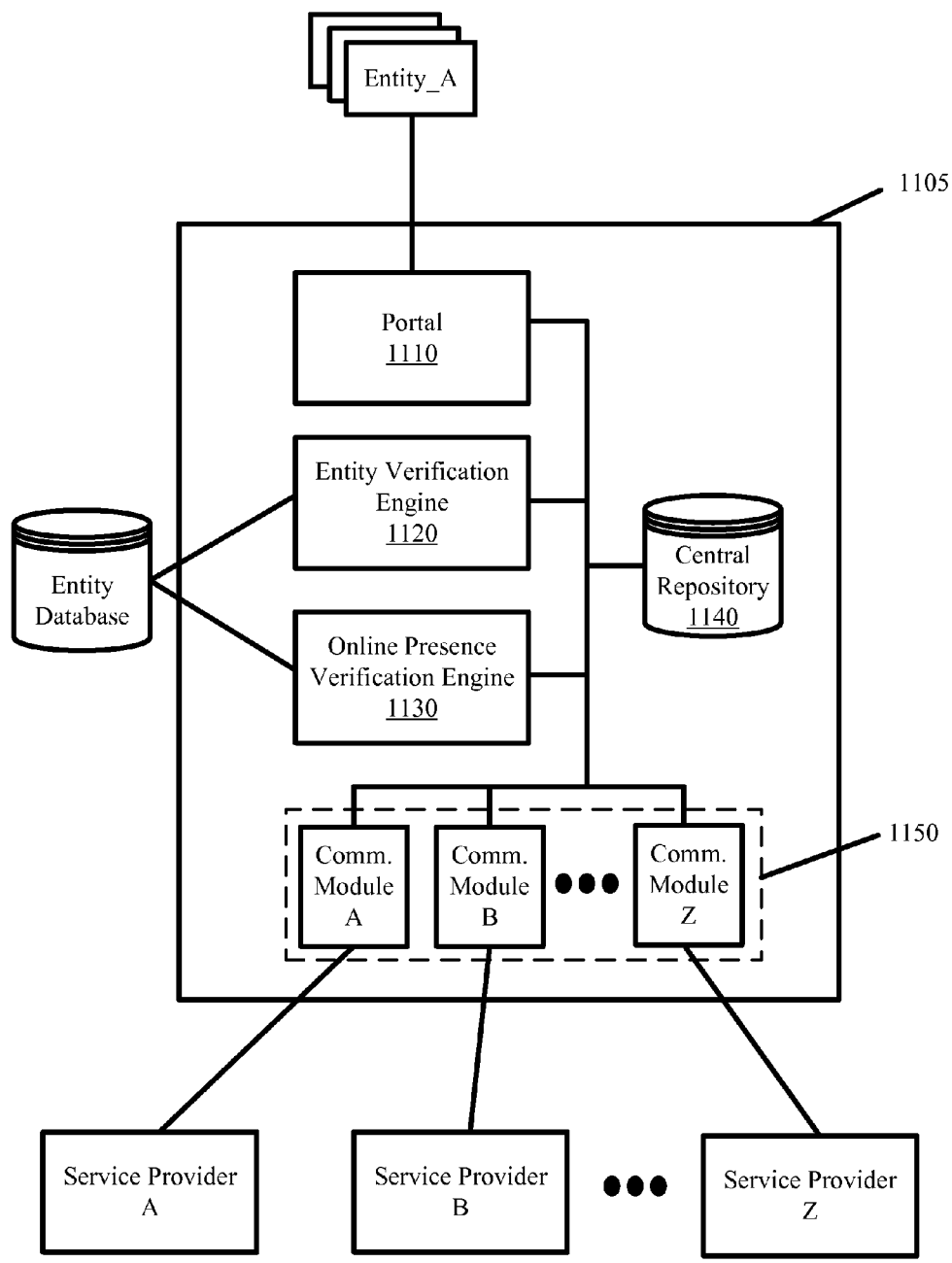
FIG. 11 illustrates various components of the advocate system in accordance with some embodiments.

FIG. 11 illustrates various components of the advocate system 1105 in accordance with some embodiments. The advocate system 1105 includes portal 1110, entity verification engine 1120, online presence verification engine 1130, central repository 1140, and communication modules 1150. The components 1110-1150 may be implemented using a combination of software and hardware with each component 1110-1150 implemented as software running on separate hardware platforms or as software running on a single hardware platform. The software is encoded in a non-transitory computer readable storage medium of the hardware platform that is accessed and run on one or more processors of the corresponding hardware platform. Collectively, the components 1110-1150 transform a general purpose machine into a specialized machine for performing online presence verification in accordance with the embodiments presented herein.

The portal 1110 provides interactive graphical user interfaces (GUIs) with which entities can initiate requests for entity verification and online presence verification and with which entities can provide requested information to the advocate system 1105. These interfaces are accessible to any network enabled device that supports standard networking protocols (e.g., IP, TCP, HTTP, etc.) and the interfaces can be presented using any compliant web browser application. The entity verification engine 1120 performs the entity verification process described with reference to FIG. 1 above. The online presence verification engine 1130 performs one or more of the online presence verification processes described with reference to FIGS. 5-10 above. The central repository 1140 is an optional component that is provided in advocate systems performing the comprehensive online verification process. The central repository 1140 is populated by various authoritative entities with lists of verified profiles and verified information. In some embodiments, the central repository 1140 is part of an entity database and the verified profile lists and verified information populated to the central repository 1140 are also populated to the entity database. Accordingly, the central repository 1140 may be hosted and managed by the advocate system 1105 or by a third party such as Dun & Bradstreet Corporation. The communication modules 1150 specify the various protocols and messaging for adapting the communications passed from the advocate system 1105 to the various service providers.

FIG. 12 illustrates a computer system with which some embodiments are implemented. Such a computer system includes various types of computer readable mediums and interfaces for various other types of computer readable mediums that implement the various processes, modules, and engines described above for the advocate system 1105. Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225. From these various memory units, the processor 1210 retrieves instructions to execute and data to process in order to execute the processes of the invention. The processor 1210 is a processing device such as a central processing unit, integrated circuit, graphical processing unit, etc.

The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1225.

Other embodiments use a removable storage device (such as a flash drive) as the permanent storage device Like the permanent storage device 1225, the system memory 1215 is a read-and-write memory device. However, unlike storage device 1225, the system memory is a volatile read-and-write memory, such as random access memory (RAM). The system memory stores some of the instructions and data that the processor needs at runtime. In some embodiments, the processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include any of a capacitive touchscreen, resistive touchscreen, any other touchscreen technology, a trackpad that is part of the computing system 1200 or attached as a peripheral, a set of touch sensitive buttons or touch sensitive keys that are used to provide inputs to the computing system 1200, or any other touch sensing hardware that detects multiple touches and that is coupled to the computing system 1200 or is attached as a peripheral. The input device 1230 also include alphanumeric keypads (including physical keyboards and touchscreen keyboards), pointing devices (also called "cursor control devices"). The input devices 1230 also include audio input devices (e.g., microphones, MIDI musical instruments, etc.). The output devices 1235 display images generated by the computer system. The output devices include printers and display devices, such as liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the internet. For example, the computer 1200 may be coupled to a web server (network 1265) so that a web browser executing on the computer 1200 can interact with the web server as a user interacts with a GUI that operates in the web browser.

As mentioned above, the computer system 1200 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention.

I claim:

1. A computer-implemented method performed by a verification system comprising a server with a hardware processor, the computer-implemented method for monitoring an online presence of a particular entity, the computer-implemented method comprising:
    maintaining a list comprising a first set of service providers that host a verified online presence of the particular entity, wherein the verified online presence comprises at least one of information and a profile for the particular entity that has been verified;
    querying each of a different second set of service providers using at least one identifier identifying the particular entity;
    identifying a particular service provider from the second set of service providers that hosts an unverified online presence of the particular entity, wherein the unverified online presence comprises at least one of information and a profile for the particular entity that has not been verified;
    placing the particular service provider on notice regarding the unverified online presence that it hosts for the particular entity; and
    verifying with at least one of the particular entity and the particular service provider that the online presence of the particular entity that is hosted by the particular service provider has been verified.

2. The computer-implemented method of claim 1, wherein placing the particular service provider on notice elicits a verification action for verifying the online presence that the particular service provider hosts for the particular entity.

3. The computer-implemented method of claim 2 further comprising updating the first set of service provides to include the particular service provider upon completion of the verification action.

4. The computer-implemented method of claim 1 further comprising providing the particular entity with notice of the unverified online presence of the particular entity that is hosted by the particular service provider.

5. The computer-implemented method of claim 4 further comprising receiving verification status for the online presence that is hosted by the particular service provider from the particular entity in response to providing the particular entity with the notice.

6. The computer-implemented method of claim 1 further comprising receiving verified information from the particular entity for inclusion in the online presence of the particular entity.

7. The computer-implemented method of claim 6, wherein identifying the particular service provider comprises identifying an inconsistency between the verified information from the particular entity and information present on the unverified online presence that is hosted by the particular service provider.

8. The computer-implemented method of claim 1, wherein placing the particular service provider on notice comprises passing said to at least one of the profile associated with the unverified online presence and the particular service provider.

9. A computer-implemented method performed by operation of a machine of a verification system, the computer-implemented method comprising:
    receiving from an unknown party, a request to monitor an online presence of a particular entity;
    verifying the party as the particular entity by sending a code using verified contact information that is obtained for the particular entity from a source other than said party and by receiving the code from said party;
    confirming with said party, a set of service providers that host a verified online presence for the particular entity;
    identifying an unverified online presence for the particular entity at a particular service provider that is not of the set of service providers, wherein the unverified online presence comprises any of information and a profile identifying the particular entity that has not been verified; and
    eliciting verification of the unverified online presence at the particular service provider by providing notice of the unverified online presence to at least one of (i) the particular service provider, (ii) the particular entity, and (iii) a profile associated with the unverified online presence at the particular service provider, and wherein providing said notice comprises providing the verified contact information of the particular entity.

10. The computer-implemented method of claim 9 further comprising receiving verified information from the party for inclusion as part of a verified online presence of the particular entity.

11. The computer-implemented method of claim 10, wherein eliciting verification comprises verifying the online presence of the particular entity at the particular service provider when the information from the online presence matches to the verified information from the party.

12. The computer-implemented method of claim 10, wherein eliciting verification comprises providing the verified information to the particular service provider for inclusion as part of the unverified online presence at the particular service provider.

13. The computer-implemented method of claim 12, wherein eliciting verification further comprises verifying the online presence for the particular entity at the particular service provider by confirming that the online presence includes the verified information.

14. The computer-implemented method of claim 12 further comprising disseminating the verified information to each of a plurality of service providers that host a verified online presence of the particular entity.

15. The computer-implemented method of claim 14 further comprising verifying that the verified information is included within the online presence of the particular entity at each of the plurality of service providers.

16. The computer-implemented method of claim 10, wherein identifying the unverified online presence comprises indentifying that information provided in the unverified online presence does not match with the verified information from the party.

17. The computer-implemented method of claim 9, wherein eliciting verification comprises receiving verification of the online presence at the particular service provider after providing the notice and adding the particular service provider to a listing of service providers hosting a verified online presence for the particular entity.

18. A non-transitory computer-readable medium storing instructions which, when executed by a hardware processor of a verification system machine, cause the processor to perform operations comprising:
receiving from an unknown party, a request to manage an online presence of a particular entity;
verifying the party as the particular entity;
identifying a plurality of different service providers that host an online presence of the particular entity, wherein each online presence comprises common information about the particular entity;
receiving an updated value for the common information from the party;
eliciting verification of the online presence for the particular entity across the plurality of service providers by disseminating the updated value to each service provider of the plurality of different service providers;
verifying (i) that each of a first subset of the plurality of service providers hosts a verified online presence of the particular entity when the online presence for the particular entity at each service provider of the first subset of service providers includes the updated value for the common information and (ii) that each of a second different subset of the plurality of service providers hosts an unverified online presence of the particular entity when the online presence for the particular entity at each service provider of the second subset of service providers does not include the updated value for the common information; and
adding the first subset of the plurality of service providers to a listing of service providers that host a verified online presence for the particular entity.

* * * * *